// Patented May 25, 1943

UNITED STATES PATENT OFFICE 2,319,952

THERMOPLASTIC LIGNOCELLULOSIC PRODUCT AND METHOD OF MAKING THE SAME

Arlie W. Schorger, Madison, Wis., assignor to Burgess Cellulose Company, Freeport, Ill., a corporation of Delaware No Drawing. Application February 19, 1940, Serial No. 319,690

11 Claims. (Cl. 260—10)

This invention relates to an improved method of making a thermoplastic lignocellulosic material capable of being molded under heat and pressure into hard, resinous products by heat-treating natural lignocellulosic material. The invention provides an improvement in the heat-treating method whereby a product having improved molding plasticity is obtained. The invention also relates to the product produced by the method.

In general, the invention relates to the type of heat treatment in which the natural lignocellulose is subjected to heating in the presence of water whereby a portion of the lignocellulose, believed to be mainly the hemicelluloses, is rendered water-soluble while the lignin is left in situ and the lignocellulose is rendered thermoplastic and capable of being hot-molded into hard, water-resistant, resinous products.

It is an object of the invention to provide an improvement in the heating method which results in increased plasticity during molding. Briefly, the improvement which characterizes the invention is obtained by cooking the natural lignocellulose in the presence of a small quantity of water and a phenolic substance.

In general, the method of producing resinous products from natural lignocellulosic materials comprises heat-treating, or cooking, a subdivided natural lignocellulose, such as wood, corncobs, straw, bagasse, cornstalks, etc., in the form of chips, sawdust, etc., with water at an elevated temperature to render water-soluble the hemicelluloses and possibly other constituents. When a natural lignocellulosic material is referred to herein, the term includes manufactured products such as newsprint containing, for example, 70% to 90% of coniferous ground wood. The ground wood in this material is substantially in its original or natural condition. The residual products, after extraction of the water-solubles by water washing, and subsequent drying, contain a large part of the original thermoplastic, resinous lignin and fibrous cellulose intrinsically unchanged. The lignin, furthermore, is retained in its natural location upon the cellulose fibers. The dried product, if not already sufficiently finely divided, is reduced to a powder which will pass through a 40-mesh, or finer, screen and is capable of being hot-molded under pressure into hard, resinous products without the employment of an added binder. Pressures of 1600 to 5000 pounds per square inch may be used, 3000 pounds being a favorable pressure, and the temperature may be from 140° C. to above 200° C., 170° C. being a favorable temperature. These general features of the method are not new with this invention, the improvement of this invention residing in the employment of a small quantity of water and a phenolic substance mixed with the lignocellulose during the heating operation.

Various methods have been suggested for preparing a plastic by heating a lignocellulose or a carbohydrate with a phenolic substance, such as phenol or cresol. In these methods, a large excess of the phenol is used, or an excess of water, or a mineral acid is added to serve as a catalyst. Such acid causes carbonization of the carbohydrates so that the plastic possesses little strength. Furthermore, the acid must be removed, and such removal is difficult. Any acid remaining causes etching of the mold. In other methods, alkaline substances have been used as catalysts, but these attempts also have met with little success.

In accordance with the present invention, the discovery has been made that when a natural lignocellulose is heat-treated with small amounts of water and a phenol, a product is obtained which has excellent plastic flow, good strength and water-resistance. Whereas in previous methods the amount of water has been equal to or more than the weight of the natural lignocellulose, in accordance with the present method the amount of water is preferably less than the weight of the lignocellulose, namely from 15% to 50%, based on the dry weight (oven dried at 105° C.) of the natural lignocellulose. When proportions are given throughout the description and claims, it is to be understood that these proportions are based on said oven dried weight of the natural lignocellulose. The permissible range of water content under the invention is from oven dry to 100%.

The amount of the phenol which is mixed with the natural lignocellulose is approximately 1% to 50%, preferably 5% to 25%. For this purpose any of the phenols may be used, and it is understood that this includes substances which, under the conditions of the cooking operation, are capable of reacting to form a phenol. "Tar acids" comprising crude phenols, may be used. During the cooking operation, the phenol combines chemically with the lignocellulose, the reaction being in the nature of a condensation. The low concentrations of water and phenol employed provide high efficiency in the fixation of the phenol. The phenol reacts with the lignin of the lignocellulosic material to impart improved properties. During heating in the presence of the water, a portion of the carbohydrates contained in the lignocellulose is decomposed, and it is believed that the phenol reacts with these carbohydrate decomposition products, as well as with the lignin, to form products which improve the properties of the molding composition.

The lignocellulosic material is comminuted prior to the cooking operation. Alternatively, it may be in the form of chips, and may be cooked with steam or water at an elevated temperature and simultaneously subjected to a disintegrating action by carrying out the cooking in a disintegrator such as a ball mill. The raw material may be impregnated with the phenol prior to the cooking operation. If it is in the form of chips, the impregnation may be carried out with or without disintegration.

The cooking operation may be carried out at temperatures from approximately 150° C. to 250° C. In the same way, the cooking time may be varied, from approximately 5 minutes to 3 hours. The conditions may be varied in accordance with the particular lignocellulosic material which is being treated and other factors, such as economy, etc. As a general matter, cooking for a short time at a high temperature is equivalent to cooking for a longer period at a lower temperature. The preferred cooking conditions are 185° C. to 210° C. and 15 to 60 minutes. During the heating operation, an exothermic reaction takes place, and cooling means should be employed if necessary to prevent excessively high temperatures. After the cooking operation, the composition is washed with water to remove the water-solubles and is then dried. If it is not sufficiently finely divided, it is reduced to a powder suitable for hot-molding.

The table which is given hereinafter shows the results obtained by cooking the natural lignocellulosic material with varying amounts of water and phenol. In each of the tests given in the table, maple wood, previously ground to a powder, was mixed with cresol (except from No. 1 which contained no phenol) and cooked in a rotating autoclave at a temperature of 205° C. for a period of one hour, and the cooked composition was washed with water, and dried at a temperature of 105° C.

Plastic flow is the property possessed by the powdered material of undergoing conversion during molding into a dense, black, structureless mass, and forming an exact reproduction of the mold cavity. The Percent Flow of the table represents the percent of the total surface area of the molded product which has the uniform color indicating complete flow. For determining flow, a molded piece 4 inches long, 2 inches wide and ⅛ inch thick was made and the dried powder was subjected in the mold to a pressure of 1000 pounds per square inch and a temperature of 150° C. to 156° C. for a period of 2 minutes. The temperature and pressure were selected intentionally below those normally used in molding in order to obtain sufficient variation for the comparative flow tests. While the table shows the percent flow of Nos. 2 and 5 to be relatively low, their flow under normal molding conditions is excellent.

M. R. represents the modulus of rupture, in pounds per square inch, of the molded product, and W. A. represents the water absorption, in percent of the weight of the molded product, undergone by the molded product after having been submerged in water at room temperature (20° C.) for 24 hours. For determining the modulus of rupture and water absorption, a molded disc 2 inches in diameter and about ⅛ inch thick was formed by placing the powdered material in a circular mold and subjecting it to a temperature of 180° C. and a pressure of 5000 pounds per square inch for 10 minutes.

Table

| No. | Percent water | Percent cresol | Percent flow | M. R. | W. A. |
|---|---|---|---|---|---|
| 1 | 15 | None | 0 | 3,626 | 9.3 |
| 2 | 15 | 5 | 7 | 5,401 | 1.87 |
| 3 | 20 | 5 | 17 | 4,968 | 3.24 |
| 4 | 20 | 15 | 92 | 4,639 | 2.54 |
| 5 | 50 | 5 | 5 | 4,986 | 8.2 |
| 6 | 100 | 5 | 0 | 5,175 | 10.0 |
| 7 | 150 | 5 | 0 | 5,285 | 9.9 |

The above table shows the marked improvement in flow and water-resistant properties produced by the addition of a small amount of water and a phenol to the cook. The use of a small amount of water causes the concentration of the phenol to be relatively high whereby high efficiency in the utilization of this substance is realized. The table also shows that by varying the proportions of water and phenol, the desired balance between plastic flow, strength and water-resistance may be obtained for a particular application. Such flexibility with respect to the properties of the product is an important advantage. In addition, the bulk density of the molding composition of this invention, in powder form, is greater than that of molding powders obtained heretofore by cooking a natural lignocellulose with water only.

For molding, a plasticizer, such as water, aniline, furfural, or a phenol may be added to the dried molding powder. However, the use of a plasticizer is of less importance with the material of this invention, because one of its outstanding properties is high flow. When cooked under suitable conditions, the dry product molds readily and completely at temperatures between 150° C. and 180° C. under the pressures commonly used in commercial molding. Prior to molding, the material may be mixed with a suitable lubricant for promoting release of the molded product from the mold. Oils, waxes and stearates, such as zinc stearate, are suitable lubricants. There may also be mixed with the material prior to molding, artificial resins and plastics, or natural resins. Sugars, such as glucose, sucrose, xylose, arabinose, etc., may be added to the mixture being cooked with beneficial results.

The molded product of the present invention is a lustrous, black, hard, homogeneous, apparently structureless mass indistinguishable by the eye from the common synthetic resins. It has a specific gravity greater than 1.35, usually between 1.42 and 1.45. When the cooking takes place in the presence of the preferred proportions, namely 15% to 50% of water and 5% to 25% of the phenol, the molded product has a water absorption not greater than 8.5% of its weight when immersed in water at room temperature (20° C.) for 24 hours.

I claim:
1. The method of forming a thermoplastic lignocellulosic composition having the property of plastic flow under heat and pressure with formation of hard, resinous products, which comprises heating at a temperature of approximately 150° C. to 250° C. for approximately 5 minutes to 3 hours a mixture consisting essentially of subdivided natural lignocellulose, up to 100% of water and 1% to 50% of a phenol, based on the weight of said lignocellulose, and washing and drying the heated mixture.

2. The method of claim 1 in which the phenol is cresol.

3. The method of claim 1 in which the phenol is phenol.

4. The method of forming a thermoplastic lignocellulosic composition having the property of plastic flow under heat and pressure with formation of hard, resinous products, which comprises heating at a temperature of approximately 150° C. to 250° C. for up to approximately 3 hours a mixture consisting essentially of a subdivided natural lignocellulose, approximately 15% to 50% of water and 5% to 25% of a phenol, based on the weight of said lignocellulose, and washing and drying the heated mixture.

5. In the method of forming a thermoplastic lignocellulosic composition having the property of plastic flow under heat and pressure with formation of hard, resinous products by cooking a subdivided natural lignocellulose at an elevated temperature in the absence of added acid and washing and drying the cooked lignocellulose, the improvement which comprises having present in admixture with said lignocellulose during the cooking operation approximately 15% to 50% of water and 5% to 25% of a phenol, based on the weight of said lignocellulose.

6. In the method of forming a thermoplastic ligocellulosic composition having the property of plastic flow under heat and pressure with formation of hard, resinous products by cooking a subdivided natural lignocellulose in the absence of added acid and washing and drying the cooked lignocellulose, the improvement which comprises having present in admixture with said lignocellulose during the cooking operation up to approximately 100% of water and 1% to 50% of a phenol, based on the weight of said lignocellulose.

7. In the method of forming a thermoplastic lignocellulosic composition having the property of plastic flow under heat and pressure with formation of hard, resinous products by water cooking a subdivided natural lignocellulose at an elevated temperature in the presence of a phenol and the absence of added acid, and washing and drying the cooked lignocellulose, the improvement which comprises limiting the water and phenol present during the cooking operation to up to approximately 50% of water and from 5% to 25% of a phenol, based on the weight of said lignocellulose.

8. The method of making a dense, black, thermoplastic, resinous product, which comprises heating at a temperature of 150° C. to 250° C. for approximately 5 minutes to 3 hours a mixture consisting essentially of a subdivided natural lignocellulose, water in amounts up to approximately 100%, and 1% to 50% of a phenol, based on the weight of said lignocellulose, washing and drying the heated mixture, and subjecting the dried mixture to heat and pressure in a mold.

9. A comminuted material which is plastic under heat and pressure, comprising a compound consisting essentially of treated natural lignocellulose and a phenol, said treated natural lignocellulose containing the natural lignin thereof in situ and being the product of cooking a subdivided natural lignocellulose at a temperature of approximately 150° C. to 250° C. for up to 3 hours in the absence of added acid and in the presence of approximately 1% to 50% of a phenol and up to approximately 100% of water, based on the weight of said lignocellulose, and washing said cooked mixture.

10. A dense, black, thermoplastic, resinous, molded product having a specific gravity of at least 1.35 and water absorption not greater than 10% when immersed in water at 20° C. for 24 hours, comprising a composition consisting essentially of treated natural lignocellulose and from 1% to 50% of a phenol, based on the weight of said lignocellulose, said phenol being combined with said lignocellulose, said lignocellulose being the product of cooking at a temperature of approximately 150° C. to 250° C. for approximately 5 minutes to 3 hours a mixture consisting essentially of a subdivided natural lignocellulose, water in amounts up to approximately 100%, and approximately 1% to 50% of a phenol, based on the weight of said lignocellulose, washing, drying and molding the cooked mixture under heat and pressure.

11. A dense, black, thermoplastic, resinous molded product having a specific gravity of at least 1.35 and a water absorption not greater than 10% when immersed in water at 20° C. for 24 hours, comprising the product resulting from the condensation of a natural lignocellulose with a phenol, said compound being the product of cooking at a temperature of approximately 150° C. to 250° C. for approximately 5 minutes to 3 hours a mixture consisting essentially of a subdivided natural lignocellulose, 5% to 25% of a phenol and approximately 15% to 50% of water, based on the weight of said lignocellulose, and washing and molding the heated mixture under heat and pressure.

ARLIE W. SCHORGER.